United States Patent Office 3,200,583
Patented Aug. 17, 1965

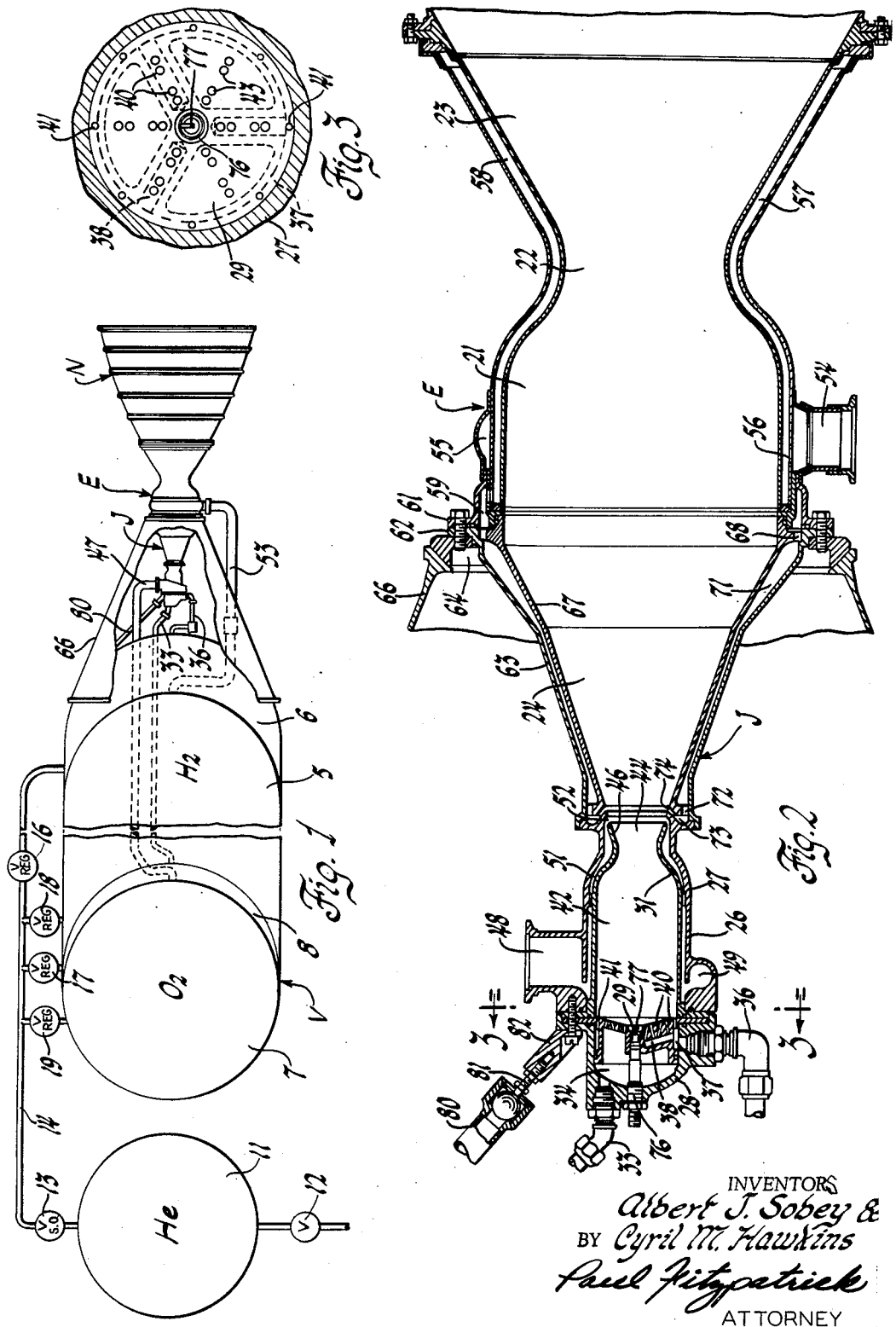

3,200,583
ROCKET PROPULSION APPARATUS
Albert J. Sobey and Cyril M. Hawkins, Indianapolis, Ind., assignors to General Motors Corporation, Detroit, Mich., a corporation of Delaware
Filed Oct. 15, 1962, Ser. No. 230,626
6 Claims. (Cl. 60—35.6)

Our invention relates to rocket engines and to the means for supplying propellants to such engines. The invention may be outlined briefly by pointing out that it involves the use of a jet pump as means for increasing the pressure of or pumping fluid fuel and oxidizer into the combustion chamber of a rocket engine. This is accomplished by burning fuel and oxidizer to provide a jet of hot gas which serves to impel, mix, and ignite the main streams of fuel and oxidizer and also to contribute to the total thrust of the rocket engine.

At present, two systems to supply liquid propellants to rocket engines are prevalent. The simplest is to use pressurized gas to force the propellants from tanks into the engine. The more sophisticated and much lighter arrangement is to use turbin-driven pumps, these pumps ordinarily being energized by some sort of gas generator. While jet pumps or injectors are very well known, it has not been considered that they would be suitable as pumping devices in a rocket engine, principally because of their relatively low efficiency. However, in this connection, the low efficiency may be largely compensated for or even overcompensated by the very considerable reduction in weight. It should also be pointed out that the gain in reliability by the use of the simple jet pump rather than turbine-driven pumps is a matter of great importance. A large proportion of rocket engine failures have resulted from failure of the fuel pumps.

The nature of the invention and the advantages thereof will be clear to those skilled in the art from the succeeding detailed description of the preferred embodiment of the invention and the accompanying drawings.

FIGURE 1 is a somewhat schematic view of a rocket vehicle, particularly the engine and propellant tanks.

FIGURE 2 is a larger scale sectional view of the rocket combustion chamber and jet propellant pump.

FIGURE 3 is a cross-sectional view of the jet pump taken on the plane indicated by the line 3—3 in FIGURE 2.

Referring first to FIGURE 1, a rocket vehicle V may comprise an engine E having a large diverging exhaust nozzle N and a set of tanks comprising a large low pressure tank 5 for liquid hydrogen, a small higher pressure tank 6 for liquid hydrogn, a large tank 7 for liquid oxygen and a small higher pressure tank 8 for liquid oxygen. It is contemplated that the small tanks contain 75 pounds of hydrogen and 300 pounds of oxygen and the large tanks 750 pounds of hydrogen and 3,000 pounds of oxygen. These weight ratios are typical for these propellants but may, of course, be varied to some extent. The absolute magnitudes may vary greatly, depending upon the size of the vehicle.

A typical conservative installation may be based upon obtaining a pressure rise of two to one in the jet pump. In other words, assuming 300 pounds per square inch pressure in the rocket combustion chamber, the pressure of the gas generated to operate the jet pump may be 500 pounds per square inch; but the pressure of the fuel which is pumped, that is, the hydrogen and oxygen in the large tanks may be 150 pounds per square inch or half that in the rocket combustion chamber. With the 500 pound pressure in the jet pump, the small oxygen and hydrogen tanks are designed to withstand a pressure of 600 pounds where, as in this case, it is contemplated that these liquids be supplied to the jet pump by gas pressure.

The simplest design involves the use of gas pressure to supply the liquids both to the jet pump and to the rocket combustion chamber. For this purpose, a spherical bottle 11 of helium under 3,000 pounds pressure is provided. Fifty-seven pounds would be a sufficient quantity under these conditions. The helium tank 11 may be filled through a fill and vent valve 12 to the 3,000 pounds pressure. There is a shut-off valve 13 which is opened when the rocket engine is put into operation to deliver the helium to a high pressure gas manifold 14. Four pressure regulating valves are connected between the manifold 14 and the respective tanks 5, 6, 7 and 8. The valve 16 supplying oxygen tank 6 and the valve 17 supplying hydrogen tank 8 may be set to reduce the helium pressure to 600 pounds per square inch to drive the propellants from tanks 6 and 8 into the jet pump. Regulating valves 18 and 19 which supply helium to pressurize the propellants in the larger tanks 5 and 7 may be set to 150 pounds per square inch. A great advantage of this low pressure level is the consequent reduction in tank weight.

Refer now to FIGURE 2, which shows the rocket combustion chamber, the initial portion of the expansion nozzle of the rocket and the jet pump apparatus. The rocket combustion chamber is indicated at 21, the throat of the rocket nozzle at 22, and the expanding portion at 23. In the place of the usual closure of the head end of the rocket combustion chamber, there is provided a conical mixing section 24 of the jet pump J. The jet pump also includes a gas generator 26 which discharges into the mixing section 24. The gas generator includes a roughly cylindrical case 27 and a head 28 bolted to the case. A spray plate 29 and a jet pump liner 31 are mounted within the case 27 and head 28, both having flanges which are held between the case and head. Liquid oxygen is supplied to the jet pump from tank 8 through a line 33 which enters the chamber 34 in the head of the gas generator behind the spray plate 29. Liquid hydrogen is supplied from tank 6 through a line 36 to an annular manifold 37 defined by a recess in the outer cylindrical surface of the spray plate 29. Three passages 38 disposed 120° apart extend inwardly from the annulus 37 through ribs in the spray plate 29. Orifices 40 extending from the passages 38 and orifices 41 extending from the annulus 37 discharge hydrogen into the combustion space 42 within the liner 31. The liquid oxygen is discharged from the space 34 through perforations 43 in the spray plate 29 to mix and combine with the hydrogen. This combustion results in a jet of very hot gases which flow through the throat 44 and expanding nozzle 46 of the gas generator into the mixing section 24.

The main flow of liquid oxygen is discharged from tank 7 through a line 47 to an inlet 48 which communicates with a scroll 49 in the wall of the jet pump 27. The oxygen flows through the annular space 51 between the two walls 27 and 31 to an outlet 52 defined between the end of expanding nozzle 46 and the slightly converging end of the wall 27 of the jet pump. The supply of liquid hydrogen for main combustion flows from tank 5 through a line 53 to a fitting 54 and scroll 55 disposed around the rocket combustion chamber 21. The portion of the rocket combustion chamber nozzle shown in FIGURE 2 is double-walled and has provision for circulation of the liquid hydrogen. The hydrogen flows from the inlet 54 and scroll 55 through apertures 56 into parallel tubes 57 which conduct the hydrogen rearwardly. It then flows through pipes 58 back to the forward end of the rocket combustion chamber where it flows into a manifold 59. The hydrogen thus flowing cools the rocket engine and nozzle and is vaporized. The rocket engine is attached by flange 61 adjacent the manifold 59 which is bolted through the flange 62 of the outer conical wall 63 of the mixing section 24 to a thrust ring 64 having a spherical surface. This thrust ring bears against a conical thrust member 66 which is fixed to the assemblage of fuel tanks.

The mixing section of the jet pump J includes inner wall 67 which is aligned at the rear end by a flange having grooves 68 through which the hydrogen flows from manifold 59 into the passage 71 between the walls of the mixing section, from which it flows through notches 72 in a flange at the forward end of the mixing section. The hydrogen flows into an annulus 73, from which it flows through the gap 74 into the mixing section, where it is picked up by the jet of gas from the gas generator 26 with the oxygen flowing through the gap 52. These gases are thus accelerated, pressurized, mixed, and ignited and burn in the combustion chamber 21.

Returning to the gas generator, the propellants in the gas generator are ignited by a standard igniter plug 76 extending through the dome 28 and through an opening in the center of the mixing plate 29 and provided with electrodes 77 at its inner end.

The rocket nozzle is aligned by three aligning struts 80, only one of which is shown, these struts being connected through adjustable screws 81 to brackets 82 fixed to the gas generator.

The operation of the engine should be clear, but may be reviewed briefly. To initiate operation of the rocket engine, valve 13 is opened causing helium to be supplied at controlled pressures to the tanks 5 to 8, inclusive, to supply propellants from them to the jet pump J and engine E, respectively. The igniter 76 is energized. The propellants enter the jet pump by way of the spray plate 29, are burned, and emerge from the nozzle 46 at supersonic speed. The main streams of propellants, which as figured here, are ten times as great as the propellants supplied to the jet pump, enter the engine by way of the inlets 48 and 54. The oxygen entering through 48 is heated only slightly because of the small heat transfer area between the oxygen and the jet pump in passing through the space 51. Oxygen will, therefore, be only slightly vaporized. The hydrogen, on the other hand, will be completely vaporized by absorbing heat from the hot gases in the walls of the rocket engine and nozzle. Thus, the gaseous hydrogen enters in a sheet and the principally liquid oxygen in a sheet between the hydrogen and the propelling gases. As a result, the fluid and oxidizer are thoroughly mixed and are ignited by the hot flame from the jet pump combustion chamber 42. The propellants expand through the diverging mixing chamber 67 and are subjected to a shock wave at the exit from the mixing chamber which will further ensure adequate mixing of fluid and oxidizer. From this point, the gases continue to burn and flow through the throat 22 as in any rocket engine installation.

Valves, not shown, may be provided in lines 47 and 53 to control the mixture of the propellants and also to shut them off, if desired. Likewise, shut-off valves, not shown, may be provided in lines 33 and 36 conducting the propellants to the jet pump with provision for adjusting the fuel to oxidizer ratio there. Provision of such adjustments are optional and shut-offs are not essential to the operation of the engine if it is not to be shut off and restarted.

It will be noted that reference has been made only to hydrogen and oxygen as propellants. The system of this invention is capable of use with other propellants, but these are the preferred ones. One reason for this lies in the fact that the pressure rise in a jet pump is inversely proportional to the molecular weight of the driving gas. By using driving gases of low molecular weight, the pressure rise is higher. In this case, by burning oxygen and hydrogen in a fuel-rich mixture, it is possible to arrive at a molecular weight in the range of 6 to 10 average, which is considered to be a desirable value for best results.

Among the advantages of the propulsion apparatus according to the invention are the fact that the vaporization of propellants during mixing is not an undesirable effect, but is a desirable and necessary part of the pumping process involving the jet pump. Another advantage is that separate fuel and oxidizer pumps are replaced by a single jet pump assembly. Moreover, a separate pump assembly is eliminated and the jet pump is used to replace a portion of the rocket engine thrust chamber. It should be pointed out that the principles of the invention may be carried a step further by employing jet pumps in series to obtain a higher pressure rise than can be gotten from one.

It should be apparent from the foregoing to those skilled in the art that the rocket propulsion apparatus according to this invention has important advantages in simplicity, reliability and, in some ranges of engine size, relatively light weight.

The description of the preferred embodiment of the invention for the purpose of explaining the principles thereof is not to be regarded as limiting the invention, since many modifications may be made by the exercise of skill in the art.

We claim:

1. Rocket propulsion apparatus comprising, in combination, first, second, third, and fourth propellant tanks, a rocket engine having a combustion chamber and a propulsion nozzle, a jet pump, the jet pump including a diverging mixing section extending into the rocket combustion chamber, means pressurizing the first and third tanks to a pressure higher than that of the rocket combustion chamber, means pressurizing the second and fourth tanks to a pressure susbtantially lower than that of the rocket combustion chamber, a combustion gas generator providing motive fluid for the jet pump, means connecting the first and third tanks to the gas generator for liberation of energy therein, means connecting the second and fourth tanks to the intake of the jet pump so that the jet pump pressurizes, mixes and ignites the propellants therefrom and delivers the propellants therefrom through the mixing section into the rocket combustion chamber, the mixing section being adapted to sustain a shock wave therein furthering mixing of the propellants and completion of the reaction between the propellants.

2. Rocket propulsion apparatus comprising, in combination, a first fuel tank, a second fuel tank, a first oxidizer tank, a second oxidizer tank, a rocket engine having a combustion chamber and a propulsion nozzle, a jet pump, the jet pump including a diverging mixing section extending into the rocket combustion chamber, means pressurizing the first tanks to a pressure higher than that of the rocket combustion chamber, means pressurizing the second tanks to a pressure substantially lower than that of the rocket combustion chamber, a combustion gas generator providing motive fluid for the jet pump, means connecting the first tanks to the gas generator for maintaining combustion therein, and means connecting the second tanks to the intake of the jet pump so that the jet pump pressurizes, mixes and ignites the fuel and oxidizer and delivers the fuel and oxidizer therefrom through the mixing section into the rocket combustion chamber.

3. Rocket propulsion apparatus comprising, in combination, a first fuel tank, a second fuel tank, a first oxidizer tank, a second oxidizer tank, a rocket engine having a combustion chamber and a propulsion nozzle, a jet pump, the jet pump including a diverging mixing section extending into the rocket combustion chamber, means pressurizing the first tanks to a pressure higher than that of the rocket combustion chamber, means pressurizing the second tanks to a pressure substantially lower than that of the rocket combustion chamber, a combustion gas generator providing motive fluid for the jet pump, means connecting the first tanks to the gas generator for maintaining combustion therein, and means connecting the second tanks to the intake of the jet pump so that the jet pump pressurizes, mixes and ignites the fuel and oxidizer and delivers the fuel and oxidizer therefrom through the mixing section into the rocket combustion chamber, the mixing section being configured to sustain a shock wave therein furthering mixing of the fuel and oxidizer and completion of combustion thereof.

4. A rocket propulsion apparatus as recited in claim 3 in which the gases generated in the gas generator have an average molecular weight approximately in the range from 6 to 10.

5. A rocket propulsion apparatus as recited in claim 3 in which the fuel is hydrogen and the oxidizer is oxygen.

6. A rocket propulsion apparatus as recited in claim 5 in which the hydrogen is admitted in an annular sheet around the discharge from the gas generator and the oxygen is admitted in a second annular sheet between the sheet of hydrogen and the said discharge.

References Cited by the Examiner
UNITED STATES PATENTS

| | | | |
|---|---|---|---|
| 2,408,111 | 9/46 | Traux et al. | 60—35.6 |
| 2,479,888 | 8/49 | Wyld et al. | 60—35.6 |
| 2,558,483 | 6/51 | Goodard | 60—35.6 X |
| 2,704,438 | 3/55 | Sheets. | |

SAMUEL LEVINE, *Primary Examiner.*

ABRAM BLUM, *Examiner.*